Oct. 18, 1932.  H. W. FISHER  1,883,662

METHOD OF REMOVING LINERS FROM PRESSURE VESSELS

Filed May 22, 1930

Inventor

Harold W. Fisher

By

W. E. Currie  Attorney

Patented Oct. 18, 1932

1,883,662

UNITED STATES PATENT OFFICE

HAROLD W. FISHER, OF ELIZABETH, NEW JERSEY, ASSIGNOR TO STANDARD-I. G. COMPANY

METHOD OF REMOVING LINERS FROM PRESSURE VESSELS

Application filed May 22, 1930. Serial No. 454,819.

This invention relates to a method for removing liners from pressure-bearing vessels by means of hydraulic or gas pressure. My invention will be fully understood from the following description and drawing which illustrates one application of my method.

Figure 1:
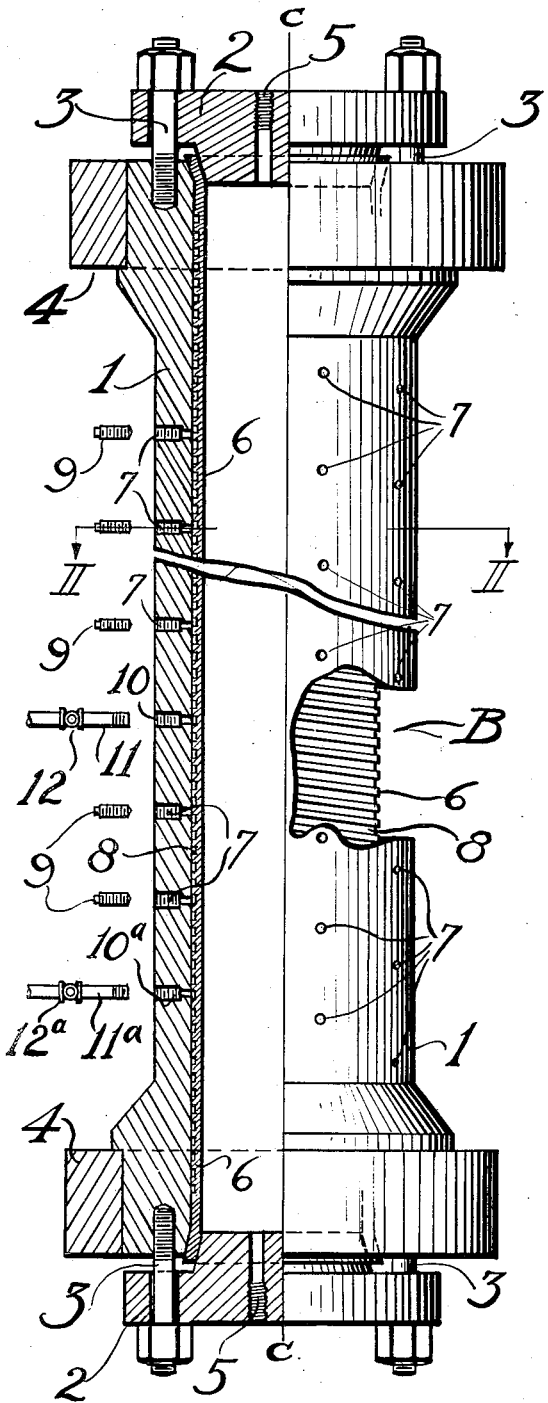

Figure 1 is a diagrammatic drawing in elevation of a high pressure vessel fitted with a liner and shows the means by which the liner may be readily removed. The portion of Figure 1 to the left of center line C—C is in sectional elevation. Part of the wall of the vessel is shown cut away at B and exposes the outer surface of the liner.

Figure 2:
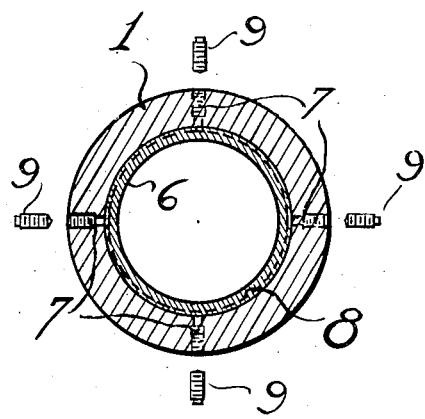

Figure 2 is a section on the line A—A of Figure 1.

Vessels which are used under conditions of high temperature and pressure often use liners in order to protect the pressure-bearing wall against reactants in the vessel. In such vessels pressures frequently in excess of 200 or even 1000 atmospheres are used in conjunction with temperatures often higher than 800 or 1200° F. The liners which are used in such vessels may consist of alloys impervious to the reactants, as will be disclosed later, or materials which are slowly attached may be used and replaced from time to time. If gases such as hydrogen are used under high pressure, the pressure-bearing wall may be attacked by hydrogen which penetrates the liner. To reduce the corrosive effect of this gas, which is most severe under conditions of high temperature and pressure, the temperature of the pressure-bearing wall may be lowered by use of internal insulation in the drum and/or the pressure of the gas in contact with the wall may be reduced by perforating the wall, thus allowing the gas to escape to the atmosphere after penetrating the liner. Internal insulation also has the advantage that a thinner wall is required, since metals possess greater strength at lower temperatures. For lower pressure operation, especially with lower temperatures, external insulation may often be utilized.

The vessel shown in Figure 1 and in section in Figure 2 comprises a pressure-bearing shell 1 provided with suitable heads 2 held by stud bolts 3. A ring 4 is shrunk on each end of the shell for additional strength when the bolts are drawn up. Material may be introduced or withdrawn from the vesel through the heads by means of openings 5 which are tapped or provided with other means for connecting inlet and outlet lines. The inside of the shell is provided with a liner 6, the outside surface of which is spirally grooved as indicated at 8. This grooved surface is shown more clearly at B where the pressure bearing wall is cut away thus exposing the outer surface of liner 6 and grooves 8. The vents 7 are drilled in the drum wall 1 at a sufficient number of points to maintain substantially atmospheric pressure in the grooves 8. For example; the vents may be drilled at points which follow in a spiral line around the outside of the wall 1, the pitch of which spiral is different from that of the grooves. In this way coincidence of the vents and the grooves may be assured at a great number of points. The vents, which may be spaced about one or two feet apart, are threaded and may be closed by plugs 9. One or more of the vents, however, such as 10 or 10a may be connected through line 11 or 11a and valve 12 or 12a to a source of hydraulic pressure (not shown).

The shell 1 and heads 2 of the vessel may be constructed of any suitable material such as low carbon steel, ordinary chrome-vanadium steel or the like. The liner 6 inside the shell serves to prevent corrosive agents within the drum from coming in contact with the pressure-bearing wall and may also serve to keep the material from contact with the iron or steel vessel which may have an undesirable catalytic effect. In order that the drum may be used for containing corrosive gases such as hydrogen, which would slowly penetrate the inner liner 6, the pressure-bearing shell 1 is preferably provided with vents 7 which allow the escape of the gas after its penetration of the liner. In this way, since the gas is under no pressure, the pressure-bearing wall 1 is not appreciably subjected to corrosive attack. The outside of the pressure-bearing liner 6 may be provided with spiral grooves 8 in order to conduct gases to the vents. It will be understood that the liner 6 may be constructed of materials resistant to corrosion such as high chromium steel or steels containing chromium and nickel, for example about 10 to 25 percent chromium and more than 5% of nickel. Low carbon steel may also be employed for this purpose, preferably where the temperature of the liner 6 is kept low by the use of internal insulation in the drum. Since low carbon steel is not resistant to corrosion, a second liner constructed of non-corrosive material is ordinarily placed between the contents of the drum and the low carbon steel liner. If a layer of internal insulation is applied it is preferably mounted between the two liners.

Since the pressure in the drum forces the pressure-bearing liner firmly against the vessel wall, considerable difficulty is experienced when it is necessary to remove this liner from large vessels. Ordinary methods such as cutting with an oxy-acetylene torch, reboring, forcing out with presses or bars, tend to injure the vessel wall, are not effective, or are excessively slow. I have now found that liners of this type may be rapidly and easily removed by use of hydraulic or gas pressure. In removing a liner the heads are firmly tightened to hold the liner in place. Plugs are then screwed into the gas vents with the exception of one or two or more convenient vents. These vents are connected by suitable pipes and valves to a source of liquid or gas under high pressure. When this gas or hydraulic pressure is applied the liner is collapsed inwardly and distorted to such an extent that it may be easily forced from the vessel after removal of the heads. It will be understood that the extreme ends of the liner held between the shell and the heads must be cut out or otherwise loosened.

It should be understood that similar liners in other vessels or tubes may be removed by my method. For example, if the vessel employs an inner liner and has no gas vents, one or two small holes may be drilled in the wall and pressure applied as above.

This invention is not to be limited by any theory nor to any specific example which may have been given for the purpose of illustration, but only by the following claims in which I wish to claim all novelty inherent in this invention.

I claim:

1. An improved method for removing a non-resilient inner liner from high pressure vessels which comprises, first, distorting the inner liner so that its cross-sectional shape is different from that of the outer shell, and then removing the distorted liner by mechanical means.

2. In the removal of a non-resilient inner linner from pressure vessels, the steps of applying hydraulic pressure between the inner liner and outer shell until the cross-sectional shape of the inner liner is distorted, then releasing the hydraulic pressure and withdrawing the distorted liner mechanically.

HAROLD W. FISHER.